United States Patent [19]

Behler et al.

[11] Patent Number: 5,308,448
[45] Date of Patent: May 3, 1994

[54] PROCESS FOR THE FLOTATION OF FILLERS FROM DEINKED WASTE PAPER IN THE PRESENCE OF SURFACTANTS CONTAINING SULFONATE GROUPS

[75] Inventors: Ansgar Behler, Bottrop; Rainer Hoefer, Duesseldorf; Klaus Hornfeck, Hettmann; Wolfgang von Rybinski, Duesseldorf, all of Fed. Rep. of Germany

[73] Assignee: Henkel Kommanditgesellschaft auf Aktien, Duesseldorf, Fed. Rep. of Germany

[21] Appl. No.: 15,280

[22] Filed: Feb. 8, 1993

Related U.S. Application Data

[63] Continuation of Ser. No. 721,515, filed as PCT/EP90/00022, Jan. 5, 1990, abandoned.

[30] Foreign Application Priority Data

Jan. 14, 1989 [DE] Fed. Rep. of Germany ....... 3900940

[51] Int. Cl.$^5$ ................................................ D21C 5/02
[52] U.S. Cl. ............................................ 162/7; 162/8
[58] Field of Search .................................. 162/5, 7, 8

[56] References Cited

U.S. PATENT DOCUMENTS

| | | | |
|---|---|---|---|
| 4,360,402 | 11/1982 | Ortner et al. | 162/5 |
| 4,368,101 | 1/1983 | Bahr et al. | 162/4 |
| 4,376,011 | 3/1983 | Menschhorn et al. | 162/5 |

FOREIGN PATENT DOCUMENTS

| | | | |
|---|---|---|---|
| 2803804 | 10/1978 | Fed. Rep. of Germany | 162/5 |
| 49-47604 | 5/1974 | Japan | 162/5 |
| 149394 | 9/1983 | Japan | 162/7 |
| 59-30978 | 2/1984 | Japan | 162/5 |
| 155793 | 8/1985 | Japan | 162/5 |
| 239586 | 11/1985 | Japan | 162/5 |
| 1207686 | 9/1986 | Japan | 162/5 |

OTHER PUBLICATIONS

Quick et al "Xerography deinking-a fundamental approach" Tappi Journal, Mar. 1986.

*Primary Examiner*—Karen M. Hastings
*Attorney, Agent, or Firm*—Ernest G. Szoke; Wayne C. Jaeschke; Real J. Grandmaison

[57] ABSTRACT

The invention relates to a process for the flotation of fillers from deinked waste paper in the presence of surfactants containing sulfonate groups.

4 Claims, No Drawings

PROCESS FOR THE FLOTATION OF FILLERS FROM DEINKED WASTE PAPER IN THE PRESENCE OF SURFACTANTS CONTAINING SULFONATE GROUPS

This application is a continuation of application Ser. No. 07/721,515, filed as PCT/EP90/00022, Jan. 5, 1990, now abandoned.

BACKGROUND OF THE INVENTION

1. Field of the Invention

This invention relates to a process for the removal of fillers from wastepaper and to the use of certain surfactants containing sulfonate groups for the removal of fillers from wastepaper.

2. Statement of Related Art

Fillers are added to almost all papers to improve their printability, their density and their opacity and to obtain a more uniform degree of light transmission and greater whiteness. The fillers used are mineral by nature or are chemically precipitated products, for example aluminum silicates, such as kaolins or siliceous alumina, calcium carbonates, such as chalk or lime, talcum, calcium sulfate ana/or barium sulfate (*Ullmanns Encyklopadie der technischen Chemie* 17, 577 et seq. (1979)). The filler content of the paper stock depends on the purpose for which the paper is to be used and, in most cases, is between 7 and 25% by weight. To be able to produce a paper having standardized quality features, it is essential that the starting materials and auxiliaries used to make the paper are of uniform quality. Printed wastepaper is used in large quantities in the production of printing paper and tissue paper. To obtain high whiteness, the printing inks have to be removed from printed wastepaper. This is done by deinking processes essentially comprising two steps, namely:

1. pulping the wastepaper, i.e. fiberizing in water in the presence of the chemicals required for detachment of the printing ink particles and
2. removal of the detached printing ink particles from the fiber suspension.

The second step can be carried out by washing or flotation (*Ullmanns Encyklopadie der technischen Chemie*, 4th Edition, Vol. 17, pages 570–571 (1979)). In flotation, which utilizes the difference in wettability between printing inks and paper fibers, air is forced or drawn through the fiber suspension. Small air bubbles attach themselves to the Printing ink particles and form a froth at the surface of the water which is removed by clarifiers.

The deinking of wastepaper is normally carried out at alkaline pH values in the presence of alkali hydroxides, alkali silicates, oxidative bleaches and surfactants at temperatures in the range from 30° to 50° C. Soaps and/or fatty alcohol polyglycol ethers are often used as surfactants which are responsible for the detachment and separation of the printing inks (*Ullmanns Encyklopa die der technischen Chemie*, 4th Edition., Vol. 17, pages 571–572 (1979)). JP 61/207686, reported in Chem. Abstr. 106, 121694v., describes the use of aliphatic α-sulfocarboxylic acids and aliphatic a-sulfocarboxylic acid esters in flotation deinking processes. According to Russian patents SU 773 174, reported in *Derwent* 51102 D/28 and SU 717 95 reported in *Derwent* 72992 C/41, good results are obtained in the flotation of printing ink when wastepaper is treated with mixtures containing alkyl sulfonates and soaps. According to U.S. Pat. No. 1,925,372, particularly good deinking results can be obtained when filler-containing wastepaper is treated with aqueous solutions containing soaps and/or sulfonated mineral oils and the paper fibers are subsequently removed by filtration. In the case of filler-free printed wastepaper, fillers are separately added.

Unfortunately, the known processes for separating the detached printing ink particles from the fiber suspensions have serious disadvantages. The high filler component of wastepaper is only removed very incompletely by flotation, so that the proportion of deinked wastepaper is limited to around 50% by weight in paper manufacture, particularly in the manufacture of newsprint paper. Although the fillers present in wastepaper are removed by washing of the paper fibers, there is the disadvantage of a very high fiber loss and very serious water pollution.

It is known from *Wochenblatt fur Papierfabrikation* 17, 646–649 (1985) that the removal of fillers by flotation can be increased if the wastepaper is treated with aqueous liquors containing alkyl benzenesulfonates in particular as surfactants and not with aqueous liquors containing soaps or nonionic surfactants. In many cases, however, the improvement in filler removal is not sufficient to meet the stringent requirements which the quality of reusable waste paper has to satisfy.

DESCRIPTION OF THE INVENTION

Accordingly, the problem addressed by the present invention was to develop a process with which a distinct increase could be obtained in the removal of fillers from wastepaper.

SUMMARY OF THE INVENTION

The invention is based on the surprising observation that the removal of fillers from aqueous paper stock suspensions is distinctly increased in the presence of certain surfactants containing sulfonate groups.

Accordingly, the present invention relates to a process for the removal of fillers from wastepaper which is characterized in that, after flotation of the printing ink, one or more sulfonate-group-containing surfactants from the groups a) α-sulfofatty acids and/or α-sulfofatty acid esters corresponding to general formula I

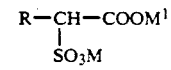

in which R is $C_{6-20}$ alkyl, M is hydrogen, an alkali metal or ammonium cation and $M^1$ is hydrogen, an alkali metal or ammonium cation or $C_{1-4}$ alkyl, and/or b) alkali, ammonium and/or amine salts of sulfonated unsaturated $C_{12-22}$ fatty acids and/or c) alkali, ammonium and/or amine salts of sulfosuccinic acid mono- and/or diesters and/or sulfosuccinic acid mono- and/or di-amides and/or d) secondary $C_{11-17}$ alkane sulfonates in the form of their alkali, ammonium and/or amine salts is/are added to the aqueous paper stock suspensions in a total quantity of from 0.1 to 8 g/kg of air-dry paper stock, followed by flotation in known manner.

The present invention also relates to the use of one or more sulfonate-group-containing surfactants of groups a) to d) for the removal of fillers from wastepaper by flotation.

Air-dry paper stock is paper stock in which an equilibrium state of internal moisture has been established. This is dependent on temperature and relative air humidity.

"Fillers" are understood to be the substances typically used in the paper industry, for example aluminium silicates, such as kaolins or siliceous alumina, and/or calcium carbonates, such as chalk or lime.

DESCRIPTION OF PREFERRED EMBODIMENTS

Preferred α-sulfofatty acids and/or α-sulfofatty acid esters in the form of their alkali and/or ammonium salts are derived from saturated $C_{12-18}$ fatty acids and/or esters and from mixtures predominantly containing saturated $C_{12-18}$ fatty acids and/or esters, for example sodium salts of α-sulfonated tallow fatty acid methyl ester, α-sulfonated coconut oil fatty acid and/or α-sulfonated palm kernel oil fatty acid methyl ester. The α-sulfofatty acids and α-sulfofatty acid esters are obtained by sulfonation of the corresponding fatty acids and/or fatty acid esters. $SO_3$-containing gas mixtures are used as the sulfonating reagent (*Ullmanns Encyklopadie der technischen Chemie*, 4th Edition, Vol. 22, page 482, Verlag Chemie Weinheim (1982)).

Alkali, ammonium and/or amine salts of sulfonated unsaturated fatty acids containing 12 to 22 carbon atoms are also obtainable by known methods. They are produced from mono- and/or polyunsaturated $C_{12-22}$ and preferably $C_{16-22}$ fatty acids, for example palmitoleic acid, oleic acid, elaidic acid, linoleic acid, linolenic acid, erucic acid or mixtures of such unsaturated fatty acids. The sulfonation of unsaturated fatty acids can be carried out with sulfuric acid, chlorosulfonic acid or $SO_3$-containing gas mixtures. However, sulfonation is preferably carried out in accordance with GB 1,278,421 at temperatures of 20° to 60° C. using gas mixtures of $SO_3$ and air or inert gases, for example nitrogen, in which the $SO_3$ content is between 1 and 15% by volume. The sulfonation reactions are carried out continuously or discontinuously in standard reactors of the type suitable and typically used for the sulfonation of fatty acid esters or olefins, preferably of the falling film type (Kirk-Othmer: *Encyclopedia of Chemical Technology* 22, 28f (1983)). On completion of the sulfonation reaction, the reaction mixture is hydrolyzed with alkalis, for example NaOH, KOH, ammonia and/or ethanolamines, in the form of aqueous solutions.

Alkali, ammonium and/or amine salts of sulfosuccinic acid mono- and/or diesters and/or sulfosuccinic acid mono- and/or diamides are obtained by reaction of maleic acid monoester and/or diester and/or the corresponding amides with alkali hydrogen sulfites, sulfites, pyrosulfites or it disulfites (*Ullmanns Encyklopadie der technischen Chemie*, Vol. 22, pages 482 to 483, Verlag Chemie Weinheim (1982)). Sulfosuccinic acid diesters and diamides are preferably prepared by reaction of maleic anhydride with approximately 2 moles of a linear, branched or cyclic alkyl alcohol or the corresponding alkyl amide containing 4 to 18 carbon atoms and subsequent sulfonation in aqueous or aqueous/organic media, for example with alkali disulfites, such as sodium disulfite, or with alkali pyrosulfites in accordance with EP 87 711. It is preferred to use sulfosuccinic acid diesters of iso-hexanol, iso-octanol, iso-nonanol, iso-decanol and/or iso-tridecanol either on their own or in combination with sulfosuccinic acid diesters of the corresponding linear alkyl alcohols.

Sulfosuccinic acid monoesters and sulfosuccinic acid monoamides are preferably reacted to the maleic acid semiester or maleic acid semiamide by reaction of maleic anhydride with approximately 1 mole of a linear, branched or cyclic, optionally alkoxylated alkyl alcohol or an optionally alkoxylated mono-, di- or tri-alkyl phenol containing 1 to 12 carbon atoms in each alkyl chain or a linear, branched or cyclic, optionally alkoxylated alkyl amine. The semiester or semiamide is then sulfonated, for example, with sodium or ammonium sulfite. It is preferred to use sulfosuccinic acid monoesters of $C_{8-18}$ alkyl alcohols with 0 to 30 moles ethylene oxide and/or sulfosuccinic acid monoesters of iso-octyl, iso-nonyl and/or iso-dodecyl phenols with 3 to 30 moles ethylene oxide.

In addition, alkali, ammonium and/or amine salts of secondary $C_{11-17}$ alkyl sulfonates, which can be produced on an industrial scale by reaction of linear paraffins with, for example, $SO_2$ and oxygen in the presence of radical-forming substances, such as ozone, organic peroxides or UV light (Winnacker/Küchler in *Chemische Technologic*, 4th Edition, Vol. 7, pages 114-116, Carl Hanser Verlag München 1986), are also suitable for the process according to the invention.

According to the invention, surfactants containing sulfonate groups are added to the aqueous paper stock suspensions at 20° to 60° C. after flotation of the printing ink, preferably in a quantity of 1 to 4 g surfactant per kg air-dry paper stock. The pH value of the suspensions is between 7 and 11 and preferably between 8 and 10. The paper stock content in the suspensions is, for example, from 0.5 to 2% by weight. Flotation is then carried out in known manner at temperatures of 20° to 95° C. and preferably at temperatures of 45° to 60° C., for example in a Denver flotation cell.

The fibrous material obtained by the process according to the invention is distinguished from fibrous material flotated in the presence of typical surfactants by distinctly lower filler contents. It is now possible by the process according to the invention to increase the proportion of deinked wastepaper in paper manufacture to more than 50% by weight.

EXAMPLES

Flotation was carried out in an approximately 9 liter Denver laboratory flotation cell using aqueous filler suspensions and aqueous paper stock suspensions.

Example 1

Filler suspensions 23 g fillers were dispersed in 9 l water and the resulting dispersion adjusted with sodium hydroxide to a pH value of 8.5 to 9.0. After the addition of 0.2 g active substance in the form of of surfactant containing sulfonate groups, flotation was carried out for 7 minutes in the Denver laboratory flotation cell. The solids component in the overflow from the flotation cell was filtered off, dried at 105° C. to constant weight and weighed. The results are shown in Table 1.

TABLE 1

| Surfactants used | Fillers used | Filler from the overflow in % by weight |
|---|---|---|
| Sulfosuccinic acid mono-$C_{12-18}$-alkyl ester, sodium salt | Kaolin | 94 |
| | $CaCO_3$ | 64 |
| | Kaolin/$CaCO_3$*⁾ | 77 |
| Oleic acid sulfonate, | Kaolin | 80 |

TABLE 1-continued

| Surfactants used | Fillers used | Filler from the overflow in % by weight |
|---|---|---|
| sodium salt | CaCO$_3$ | 82 |
| | Kaolin/CaCO$_3$*) | 61 |
| For comparison: | | |
| n-Dodecyl benzene | Kaolin | 3 |
| sulfonate, sodium | CaCO$_3$ | 4 |
| salt | Kaolin/CaCO$_3$*) | 4 |
| α-C$_{14-16}$-olefin | Kaolin | 42 |
| sulfonate, sodium | CaCO$_3$ | 43 |
| salt | Kaolin/CaCO$_3$ | 60 |
| Dodecyl diphenylether | Kaolin | 30 |
| disulfonate, sodium | CaCO$_3$ | 72 |
| salt | Kaolin/CaCO$_3$*) | 34 |

*)Mixture of 70% by weight kaolin and 30% by weight CaCO$_3$

Example 2

Paper stock suspensions

Air-dry paper stock from newspapers and magazines (ratio by weight 1:1) was subjected to printing ink flotation with the chemicals normally used. After flotation of the printing ink, the paper stock suspension had a stock density of 1% by weight, a temperature of 40° C., a pH value of 9.0 and an ash content of 16% by weight. 0.2 g active substance in the form of surfactant containing sulfonate groups was added to 9 l of the deinked paper stock suspension having a stock density of 1% by weight, followed by flotation for 10 minutes in the Denver laboratory flotation cell. After flotation, the paper stock was freed from water in paper filters, dried at 105° C. to constant weight and its ash content determined in accordance with DIN 54 371. The results are shown in Table 2.

TABLE 2

| Surfactants used | Filler content after flotation in the paper in % by weight |
|---|---|
| Oleic acid sulfonate, sodium salt | 6.0 |
| Sulfosuccinic acid mono-C$_{12-18}$-alkyl ester, sodium salt | 5.3 |

What is claimed is:

1. A process for the removal by flotation of fillers from deinked suspensions of fibers derived from waste paper, wherein after deinking said waste paper by flotation the improvement comprises adding to the suspensions of fibers from 0.1 to 8 g. per kilogram of air-dry paper stock, of one or more surfactants selected from the group consisting of:

a) α-sulfofatty acids and α-sulfofatty acid esters corresponding to general formula I:

$$R-CH-COOM^1$$
$$|$$
$$SO_3M$$

in which R is C$_{6-20}$ alkyl; M is hydrogen, an alkali metal, or ammonium cation; and M$^1$ is hydrogen, an alkali metal, or ammonium cation or C$_{1-4}$ alkyl; and b) alkali, ammonium, and amine salts of sulfonated unsaturated C$_{12-22}$ fatty acids; and c) alkali, ammonium, and amine salts of sulfosuccinic acid mono- and di-esters and sulfosuccinic acid mono- and diamides; and d) alkali, ammonium, and amine salts of secondary C$_{11-17}$ alkane sulfonates; and then removing said fillers by flotation.

2. A process as claimed in claim 1, wherein the total amount of surfactants a) to d) added to the paper stock suspensions is from 1 to 4 g/kg air-dry paper stock.

3. A process as claimed in claim 2, wherein said surfactants are selected from the group consisting of:

a) α-sulfofatty acids and α-sulfofatty acid esters corresponding to general formula I, in which R is a C$_{10-16}$ alkyl radical, M is an alkali metal or ammonium cation and M$^1$ is an alkali metal or ammonium cation or a C$_{1-4}$ alkyl radical; and b) alkali, ammonium, and amine salts of sulfonated, unsaturated C$_{16-22}$ fatty acids; and c) alkali, ammonium, and amine salts of sulfosuccinic acid monoesters of C$_{8-18}$ alkyl alcohols with 0 to 30 moles ethylene oxide, of iso-octyl, iso-nonyl and iso-dodecyl phenols with 3 to 30 moles ethylene oxide, and of sulfosuccinic acid di-C$_{4-18}$-alkyl esters.

4. A process as claimed in claim 1, wherein said surfactants are selected from the group consisting of:

a) α-sulfofatty acids and α-sulfofatty acid esters corresponding to general formula I, in which R is a C$_{10-16}$ alkyl radical, M is an alkali metal or ammonium cation and M$^1$ is an alkali metal or ammonium cation or a C$_{1-4}$ alkyl radical; and b) alkali, ammonium, and amine salts of sulfonated, unsaturated C$_{16-22}$ fatty acids; and c) alkali, ammonium, and amine salts of sulfosuccinic acid monoesters of C$_{8-18}$ alkyl alcohols with 0 to 30 moles ethylene oxide, of iso-octyl, iso-nonyl, and iso-dodecyl phenols with 3 to 30 moles ethylene oxide, and of sulfosuccinic acid di-C$_{4-18}$-alkyl esters.

* * * * *